(12) United States Patent
Berry et al.

(10) Patent No.: US 7,452,849 B2
(45) Date of Patent: Nov. 18, 2008

(54) SILICONE RESIN FOR DRILLING FLUID LOSS CONTROL

(75) Inventors: Vicki Lynn Berry, Midland, MI (US); Julie Lyn Cook, Turner, MI (US); Susan J. Gelderbloom, Midland, MI (US); Diane Marie Kosal, Midland, MI (US); Donald Taylor Liles, Midland, MI (US); Charles W. Olsen, Jr., Midland, MI (US); Christian Francis C. Rome, Brussels (BE)

(73) Assignee: Dow Corning Corporation, Midland, MI (US)

( * ) Notice: Subject to any disclaimer, the term of this patent is extended or adjusted under 35 U.S.C. 154(b) by 575 days.

(21) Appl. No.: 10/523,148

(22) PCT Filed: Jul. 31, 2003

(86) PCT No.: PCT/US03/24011

§ 371 (c)(1),
(2), (4) Date: Aug. 8, 2005

(87) PCT Pub. No.: WO2004/011530

PCT Pub. Date: Feb. 5, 2004

(65) Prior Publication Data

US 2006/0111521 A1 May 25, 2006

(30) Foreign Application Priority Data

Jul. 31, 2002 (EP) .................................. 02255363

(51) Int. Cl.
*C09K 8/035* (2006.01)
*B01F 3/12* (2006.01)

(52) U.S. Cl. ............................ 507/127; 175/65; 516/77; 516/79

(58) Field of Classification Search ................. 507/127, 507/117; 175/65; 516/77, 79
See application file for complete search history.

(56) References Cited

U.S. PATENT DOCUMENTS

| | | | |
|---|---|---|---|
| 3,302,719 A | 2/1967 | Fischer | 166/42 |
| 3,882,029 A | 5/1975 | Fischer et al. | 252/8.55 |
| 3,954,629 A | 5/1976 | Scheffel et al. | 252/8.5 |
| 5,973,060 A | 10/1999 | Ozaki et al. | 524/506 |
| 6,107,429 A | 8/2000 | Sojka | 526/323.2 |
| 6,180,236 B1 | 1/2001 | Hamada et al. | 428/402 |
| 6,196,316 B1 | 3/2001 | Bosma et al. | 166/294 |

FOREIGN PATENT DOCUMENTS

WO WO 2004/013251 A1 * 2/2004

* cited by examiner

*Primary Examiner*—Timothy J Kugel
(74) *Attorney, Agent, or Firm*—Patricia M. Scaduto

(57) ABSTRACT

A silicone MQ resin based composition provides the oil industry with Fluid Loss Control (FLC) additives for water based drilling muds which are non-damaging. The composition is capable of achieving zero fluid seepage through filter cake, and a short build time for the initial filter cake, while not reducing the return flow of oil from producing formations. The composition is stable in saturated salt at 120° C. and elevated pressures. The composition comprises solid particles of silicone resin with a glass transition temperature more than 70° C., and it contains solid particles of silicone resin with a particle size distribution in which ( ) at least 90 volume percent of solid particles of silicone resin have an average major axis diameter of 40 μm or less than 40 μm, and (ii) at least 10 volume percent of solid particles of silicone resin have an average major axis diameter of 2 μm or less.

10 Claims, 1 Drawing Sheet

SILICONE RESIN FOR DRILLING FLUID LOSS CONTROL

CROSS REFERENCE TO RELATED APPLICATIONS

Figure 1:
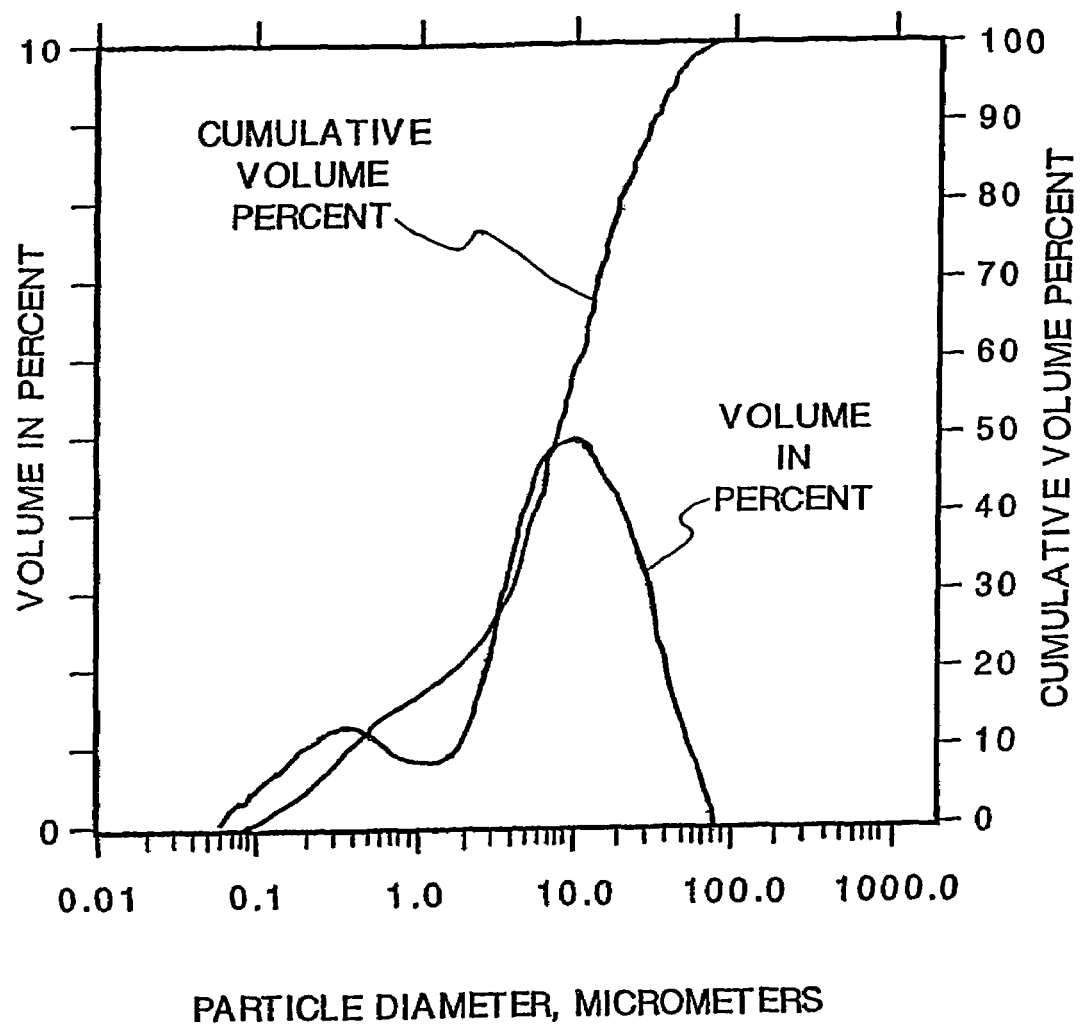

This application is a U.S. national stage filing under 35 U.S.C. §371 of PCT Application No. PCT/US2003/024011 filed 31 Jul. 2003, currently, which claims the benefit of EP Patent Application No. 02255363.0 filed on 31 Jul. 2002 under 35 U.S.C. §119 (a)-(d) and 35 U.S.C. §365(a). PCT Application No. PCT/US2003/024011 and EP Patent Application No. 02255363.0 are hereby incorporated by reference.

The invention particularly relates to such a composition, the process for its manufacture, and its use, in which the composition possesses low fluid loss properties during use, and is capable of ultimately substantially dissolving or dispersing itself into the hydrocarbon fluid with which it comes into contact, i.e., the crude oil.

In various well drilling, completion, treating, and workover operations, in permeable hydrocarbon producing reservoirs, it is often advantageous to inject a fluid into the well in such a manner that the fluid is in contact with the reservoir penetrated by the well. The injected fluid may be used, for example, as a drilling fluid, a hydraulic fracturing fluid, an acidizing fluid, or a fluid for the placement of a gravel pack in the well. Generally, injected fluids have a tendency to penetrate reservoirs. Since most reservoirs are heterogeneous in permeability at least to some degree, the injected fluid tends to preferentially flow into zones of high permeability termed thief zones. Not only does this flow result in a loss and waste of the fluid, but it also prevents the injected fluid from entering into the zones of lower permeability in substantial quantities, causing poor fluid distribution between zones of different permeability.

Accordingly, fluid loss control (FLC) agents, and in particular plugging agents, have been developed for use in such fluids. These fluid loss control agents tend to plate out on the face of the reservoir into which the fluid is being injected, and restrict further fluid flow through that portion of the reservoir. In the various well operations, it is necessary that the fluid loss control or plugging agent be eventually readily removed from the hydrocarbon producing zones to prevent a permanent reduction in oil production rate.

Removal of the plugging material may be effectively accomplished by utilizing an agent that is soluble in the reservoir fluids, either water or hydrocarbons, and initiate well production. However, many of the known materials are either (i) insoluble under bottom hole conditions or (ii) so highly soluble that they are difficult to place in the reservoir before they dissolve, and fail to provide and maintain the required plugging action throughout the treating operation. Furthermore, known materials often experience dramatic changes in their properties over the temperature ranges encountered in current drilling operations.

It is therefore essential that the fluid loss or plugging agent composition possess the property of controlled solubility, which will remain constant over a broad range of temperatures, whereby a satisfactory solid plug can be formed for the period of time necessary to carry out the well operation, and which can subsequently be removed by dissolving in the reservoir's hydrocarbon fluids.

It is also considered advantageous to utilize additives that are largely soluble in hydrocarbons and insoluble in water, thereby leaving any water producing strata permanently sealed. Thus, selective plugging is effected, the hydrocarbon producing strata are temporarily plugged and the water producing strata remain permanently sealed. Upon removal of the temporary plugging agent from the hydrocarbon producing strata, oil and gas production capability is fully restored, while water production is eliminated or substantially decreased.

Various slowly oil soluble, water insoluble, particulate agents useful in well drilling and treating operations have been developed in the past. For example, U.S. Pat. No. 3,302,719 (February 1967) describes solid particles of a homogeneous mixture of polymers such as poly-1-olefin or copolymers of ethylene and an alkyl acrylate, waxes such as paraffin petroleum wax, and resins such as esters of rosin or aliphatic hydrocarbon resins. According to the '719 patent, such mixtures can be added to pumpable liquid carrier fluids and injected into wells.

U.S. Pat. No. 3,882,029 (May 1975) discloses finely divided particles formed from a mixture of a wax, an oil soluble surface active agent, a water dispersible surface active agent, an ethylene/vinyl acetate copolymer, and a fatty alcohol. The particles are dispersed in an aqueous salt solution containing chrome lignite, hydroxyethylcellulose, and xanthan gum.

U.S. Pat. No. 3,954,629 (May 1976) shows finely divided particles formed from a mixture of a polyethylene or ethylene/vinyl acetate copolymer, a polyamide, and a softening agent such as a long chain aliphatic diamide or polyterpene resin. The particles are suspended in a liquid carrier.

However, prior art compositions such as these generally contain a wax which is an inherently soft particle, an agent that hardens the wax particle, i.e. ethylene/vinyl acetate copolymers, and one or more additives such as chrome lignite, which have low solubility in oil but which are used to improve the fluid loss control properties of the particles. According to the present invention, however, the silicone resin is inherently soluble in hydrocarbons,. and is completely dissolved even in the presence of hydrocarbons containing dissolved waxes and hydrocarbon resins.

While the use of silicones in compositions for use in well construction, repair, and/or abandonment, is known, as evidenced by U.S. Pat. No. 6,196,316 (Mar. 6, 2001), assigned to the Shell Oil Company, such compositions are silicone sealants rather than silicone resins, and hence lack any particular particle size feature or particle size distribution feature comparable to resinous compositions according to the present invention.

Therefore, in spite of the wide variety of known well treating compositions, some of which have advantages, the need remains for compositions having improved fluid loss control, and which cause reduced permeability damage to hydrocarbon producing zones of reservoirs, especially at high temperatures.

It is therefore an object of the invention to provide a well treating composition which combines improved fluid loss control properties and reduced permeability damage to reservoirs. It is also an object of the invention to provide a composition containing a minimum of oil insoluble components.

In particular, the composition contains solid particulate matter having a specific distribution of particle size. The multi-modal particle size distribution-should contain a first (upper) mode of solid particulate with a diameter 30-50 percent of the targeted pore diameter, in order to provide an optimal bridging of the porous substrate. As used herein, the term multi-modal is intended to mean that a multi-modal distribution is obtained when there are multiple peaks in the differential size distribution or frequency curve of particle diameters. The inclusion of a second (lower) mode of solid particulate matter its average diameter is 2 μm (micrometer) or less, termed the fines, necessary for optimum shutoff of the porous substrate.

Thus, a further object of the invention is to provide for the addition of fines to the formulation, and this feature achieves a practically impermeable filter cake in well bore fluid compositions containing solid particulate matter having multimodal particle size distribution.

As a result, preferred compositions according to the invention contain a first upper mode of solid particulate with a diameter of 30-50 percent of the targeted substrate pore diameter, and a second lower mode of solid particulate matter, i.e., fines, wherein the average diameter of the second mode is 2 μm (micrometer) or less. Most preferred is a particle size distribution wherein (i) at least 90 volume percent of solid particles of silicone resin have an average major axis diameter of 40 μm or less than 40 μm, and (ii) at least 10 volume percent of solid particles of silicone resin have an average major axis diameter of 2 μm or less. The term average major axis diameter is used and intended to include types of particulate matter having shapes other than spherical.

These and other objects and features of the invention will become apparent from a consideration of the detailed description.

DRAWINGS

FIG. 1 is a graphical representation showing the particle size distribution of the silicone resin according to the present invention. Particle size distribution was determined on a Malvern Mastersizer Model S with an automated sample dispersion unit and flow cell. Malvern Mastersizers employ laser diffraction techniques, specifically low angle laser light scattering (LALLS), in determining particle size.

In the FIGURE, one trace is labeled Cumulative Volume Percent of the particles, and a second trace labeled Volume in Percent shows the multi-modal particle size distribution in which there can be seen a first upper mode peak and a second lower mode peak in the distribution.

DESCRIPTION

Generally, well completion and workover fluid compositions which come into contact with an oil containing subterranean reservoir should have fluid loss control properties which are capable of minimizing invasion of the reservoir by the composition used during a well process. In particular, these compositions should prevent fluid from flowing predominantly into the more permeable portions of reservoirs having heterogeneous permeability. Following completion of the well process, injected compositions should be capable of being removed from oil containing portions of the reservoir as completely as possible, in order to minimize reduction in permeability of such strata.

The two desired attributes of fluid loss control and minimization in reduction of reservoir permeability are difficult to achieve in a single composition, since the former attribute depends in part on the presence of solid particulate matter in the composition, while the latter attribute depends on dissolution of the same type of solid particulate matter. The composition of this invention is however, tailored to provide the desired combination of maximum fluid loss control, as well as to provide a minimum of permeability reduction following completion of the well process in which the composition may be employed. The composition is characterized by the presence of a silicone resin particulate in a liquid carrier, the liquid carrier being of such nature as to permit fine wet grinding of the solid silicone resin particulate.

The silicone resin according to the invention is a silicon containing non-linear oligomer or polymer that includes trivalent, i.e., trifunctional, T units ($RSiO_{3/2}$) and tetravalent, i.e., tetrafunctional Q units ($SiO_{4/2}$), as the principle building blocks of its network structure. The silicone resin may contain divalent, i.e., difunctional D units ($R_2SiO_{2/2}$) that can act to modify the resin structure. Generally, resin structures of this type are end capped with monovalent, i.e., monofunctional M units ($R_3SiO_{1/2}$).

Useful R groups include hydrogen, hydroxyl, monovalent hydrocarbon groups having 1-8 carbon atoms among which are alkyl groups such as methyl and ethyl; aryl groups such as phenyl or naphthyl; alkenyl groups such as vinyl, allyl, 5-hexenyl, and cyclohexenyl; and arylalkyl groups such as phenylmethyl, phenylpropyl, and phenylhexyl; alkoxy groups such as methoxy, ethoxy, and propoxy; and substituted groups such as fluorocarbons including, for example 3,3,3-trifluoropropyl groups $CF_3CH_2CH_2-$.

It is preferred that the silicone resin consist of an MQ resin, i.e., the resin containing only the monovalent siloxane units M $R_3SiO_{1/2}$ and tetravalent siloxane units Q $SiO_{4/2}$, that R is methyl, and that it include no more than about 15 mole percent hydroxyl. The number ratio or molar fraction of M units to Q units should be in the range of 0.4:1 to 1.7:1, more preferably in the range of 0.6:1 to 1.5:1.

In one particularly preferred embodiment, the molar fraction of M:Q units in the methyl containing silicone resin consisted of an M fraction of 0.38-0.43 and a Q fraction of 0.57-0.62. Residual hydroxyl content was less than 3.5 weight percent as determined by Nuclear Magnetic Resonance (NMR). The M:Q ratio was selected so that the silicone resin was a solid at any temperature less than about 250° C. The weight average Molecular weight of the silicone resin was 8,000-30,000 as determined by gel permeation chromatography (gpc).

Silicone resins with appropriately selected R groups have the unique property of maintaining solubility in hydrocarbons across a wide range of molecular weights, whereas silicone resins with a large proportion of Q units additionally exhibit a very high glass transition temperature ($T_g$). $T_g$ for purposes herein, is the onset of cooperative molecular or segmental motion. Thus, at temperatures below the glass transition value, only vibrational motions exist, and therefore the material appears and acts glassy. This is an important factor when comparing the performance of organic resin systems to the performance of silicone resins at an elevated temperature.

Very high glass transition temperatures possessed by the silicone resins according to the invention allows well bore fluids to be used at temperatures far higher than comparable fluids formulated with the use of organic resins containing no silicon atoms. When a particle size distribution such as the one employed herein, is used in an organic resin containing no silicon atoms, and the organic resin is tested at temperatures below its $T_g$, performance is roughly equivalent to that obtained with the silicone resin. However, when the organic resin containing no silicon atoms is tested at temperatures above its $T_g$, it fails in performance under standard fluid loss test protocols.

It is often advantageous to add softening agents to modify the glass transition temperature to improve fluid loss under varying well conditions. Sometimes it is advantageous for reduced fluid loss to add softening agents in emulsion form. These comparisons and performance data can be seen by reference to the Table below. In the Table, the Kerosene Solution contained 90 weight percent kerosene and 10 weight percent of a silicone resin. The Kerosene Emulsion was a mixture containing 90 weight percent of kerosene and 10 weight percent of an emulsion which consisted of a 50 percent solids concentration of a silicone resin emulsified in water. The Kerosene Glycol Mix contained kerosene, the silicone resin, and propylene glycol. Pentalyn, a solid rosin ester resin composition sold by Hercules Incorporated, Wilmington, Del., consisted of fines.

| Fann 90 Test Procedure | Softening | Fann Fluid Loss, mL/s | |
|---|---|---|---|
| Temperature, ° C., and Softening Agent or Additive | Agent, Volume % in KCl Mud | Spurt Loss, mL 0-30 sec | Fluid Loss, mL 0-30 min |
| 30° C. | | | |
| Baseline, None | — | 1.69 | 5.76 |
| Reagent Grade Kerosene | 0.2 | 1.35 | 5.31 |
| Reagent Grade Kerosene | 0.4 | 1.54 | 5.26 |
| Kerosene Solution | 0.2 | 0.92 | 5.59 |
| Kerosene Solution | 0.4 | 1.5 | 5.06 |
| Kerosene Emulsion | 0.4 | 1.15 | 4.31 |
| Kerosene Emulsion | 0.4 | 0.68 | 4.30 |
| Kerosene Emulsion | 0.4 | 0.76 | 4.60 |
| 85° C. | | | |
| Baseline, None | — | 3.86 | 11.67 |
| Commercial Kerosene | 0.2 | 3.32 | 10.14 |
| Commercial Kerosene | 0.4 | 3.32 | 8.76 |
| Kerosene Solution | 0.2 | 2.75 | 10.27 |
| Kerosene Solution | 0.2 | 1.70 | 10.50 |
| Kerosene Solution | 0.4 | 3.08 | 10.33 |
| Kerosene Emulsion | 0.2 | 2.65 | 9.63 |
| Kerosene Emulsion | 0.4 | 2.80 | 6.80 |
| Kerosene Glycol Mixture | 0.4 | 1.40 | 7.0 |
| 120° C. | | | |
| Baseline, None | — | 6.45 | 19.08 |
| Reagent Grade Kerosene | 0.2 | 12.2 | 22.71 |
| Kerosene Emulsion | 0.2 | 8.99 | 20.06 |
| Kerosene Emulsion | 0.4 | 9.5 | 16.37 |
| Pentalyn Rosin Slurry | — | >50.0 | >50.0 |

Well bore fluids according to the invention are prepared by first forming the solid silicone resin particulate with the desired particle size distribution from a solution of the silicone resin, and then dispersing the silicone resin solids with the desired particle size distribution into a liquid carrier. The liquid carrier can be an aqueous based carrier or a non-aqueous based carrier. The liquid carrier, however, should not be a solvent for the silicone resin particulate. Suitable liquid carriers are therefore defined herein as those capable of dissolving only one percent or less of the silicone resin particulate at 70° C.

Some examples representative of liquid carriers considered suitable for use herein are water; diols and triols such as ethylene glycol, propylene glycol, glycerol, and trimethylene glycol; glycerol esters such as glyceryl triacetate (triacetin), glyceryl tripropionate (tripropionin), and glyceryl tributyrate (tributyrin); and polyglycols such as polyethylene glycol.

When the well bore fluid is intended to be used as in the form of an aqueous dispersion, then sufficient and appropriate surfactants and dispersing agents will be required, as well as other viscosity modifying agents and biocides to provide shelf stability and dispersion stability at the temperatures and pressures expected in the well.

Some examples of appropriate surfactants and/or dispersing agents which can be used are lignites, lignosulfonates, and modified lignosulfonates; anionic surfactants such as alkylarylsulfonates including dodecylbenzene sulfonic acid (DBSA), alkylaryl sulfates such as sodium lauryl (dodecyl) sulfate (SDS), poly(ethylene oxide) derivatives of fatty acids, and esters; nonionic surfactants such as block copolymers of ethylene oxide and propylene oxide, poly(ethylene oxide) derivatives of nonyl phenol, and alkyl glycosides; and cationic surfactants such as imidazolines and tertiary amines among which are the imidazoline and imidazoline derivatives sold under the name MRANOL® by Rhone-Poulenc Incorporated, Cranberry, N.J., and compositions such as α-(tetradecyldimethylammonio)acetate, β-(hexadecyldiethylammonio)propionate, γ-(dodecyldimethylammonio)butyrate, 3-(dodecyldimethylammonio)-propane-1-sulfonate, and 3-(tetradecyldimethylammonio)ethane-1-sulfonate.

Some examples of suitable viscosity modifying agents or thickeners which may be used are sodium alignate; gum arabic; welan gum; guar gum; xanthan; hydroxypropyl guar gum; cellulose derivatives such as methylcellulose, hydroxypropyl methylcellulose, and hydroxypropylcellulose; starch and starch derivatives such as hydroxyethylamylose and starch amylose; locust bean gum; electrolytes such as sodium chloride and ammonium chloride; saccharides such as fructose and glucose; and derivatives of saccharides such as PEG-120 methyl glucose dioleate.

Some biocides which can be used include compositions such as formaldehyde, salicylic acid, phenoxyethanol, DMDM hydantoin (1,3-dimethylol-5,5dimethyl hydantoin), 1-(3-chloroallyl)-3,5,7-triaza-1-azoniaadamantane chloride, 5-bromo-5-nitro-1,3-dioxane, methyl paraben, propyl paraben, sorbic acid, imidazolidinyl urea sold under the name GERMALL® II by Sutton Laboratories, Chatham, N.J., sodium benzoate, 5-chloro-2-methyl4-isothiazolin-3-one sold under the name KATHON CG by Rohm & Haas Company, Philadelphia, Pa., and iodopropynl butyl carbamate sold under the name GLYCACIL® L by Lonza Incorporated, Fair Lawn, N.J.

As noted above, the function of the well bore fluid composition of this invention is largely and primarily dependent upon the particular distribution of particle size in the dispersion. The particle size is on the one hand based upon a consideration of the pore size to be blocked, and on the other hand consists of the inclusion of fines for obtaining improved fluid loss control. The fines can be produced by means of wet grinding. Extremely fine particle dispersions, when required, can be provided by using one or more surfactant(s) and/or dispersing aide(s) such as listed above. Alternatively, the same general result can be achieved by employing non-aqueous fluids in the wet grinding process typically carried out in horizontal type media mills. These fine particle size dispersions are then mixed with the coarser particle size dispersions. Data providing some examples of blended particle size distributions are shown below in the Table, which also shows the resulting effectiveness at blocking specific substrate pore sizes.

In the Table, two particle size distributions of silicone resin produced by a wet grinding process were individually evaluated and then blended to optimize fluid loss in the Fann 90 test. Unless otherwise noted, the Fann 90 test was used under conditions in which the temperature was 30° C., the device was rotated at 100 reciprocal seconds rotation for 30 minutes using a 10 μm core, and maintained at a differential pressure of 500 psi with a 3 percent KCl mud.

| Composition | Spurt Loss, mL 0–30 sec | Fann Fluid Loss, mL/s Fluid Loss, mL 0–30 min | Malvern Particle Size, After Fann 90 Test, (µm) | | |
|---|---|---|---|---|---|
| | | | D(v, 0.1) | D(v, 0.5) | D(v, 0.9) |
| 3% KCl Mud | | | | | |
| 100% Grade 1 | 2.11 | 6.15 | 0.54 | 9.33 | 30.83 |
| 100% Grade 2 | 11.58 | 16.54 | 0.24 | 1.560 | 9.47 |
| 25% Grade 2 75% Grade 1 | 1.69 | 5.76 | 0.37 | 6.941 | 30.09 |
| 10% Grade 2 90% Grade 1 | 1.82 | 5.86 | 0.45 | 8.763 | 34.00 |
| 5% Grade 2 95% Grade 1 | 2.00 | 5.99 | 0.45 | 9.203 | 35.32 |
| 50% Grade 2 50% Grade 1 | 1.63 | 5.93 | 0.27 | 4.365 | 25.11 |
| 25% Grade 2 75% Grade 1 | 1.57 | 5.64 | 0.38 | 6.050 | 18.20 |
| 50% Grade 2 50% Grade 1 | 1.61 | 5.95 | 0.32 | 4.710 | 16.33 |

The performance of the dispersion can be enhanced by addition of material that tends to lower the Tg of the silicone resin to a Tg closer to the test temperature. One way to accomplish this enhancement is by addition to the dispersion of additives such as hydrocarbons capable of functioning to lower softening temperatures of silicone resins. This feature is shown below in the Table. In the Table, the silicone gum in the silicone gum emulsion had a viscosity of about 60,000 centistoke (mm$^2$/s). The silicone fluid in the silicone fluid emulsion had a viscosity of about 500 centistoke (mm$^2$/s).

| Softening Agent or Additive | Softening Agent, Volume % in KCl Mud | Resin Load, Vol. % in KCl Mud | Fann Fluid Loss, mL/s | |
|---|---|---|---|---|
| | | | Spurt Loss, mL 0-30 sec | Fluid Loss, mL 0-30 min |
| Baseline, None | — | 5.0 | 4.16 | 12.37 |
| Trimethylbenzene | 0.1 | 5.0 | 5.37 | 12.11 |
| | 0.2 | 5.0 | 5.24 | 11.77 |
| Tetrahydro naphthalene | 0.1 | 5.0 | 4.9 | 12.8 |
| | 0.2 | 5.0 | 4.9 | 12.3 |
| Pentalyn | 2.5 | 4.25 | 3.59 | 9.55 |
| Kerosene | 0.1 | 5.0 | 4.3 | 11.6 |
| | 0.2 | 5.0 | 4.7 | 11.6 |
| | 0.3 | 5.0 | 4.9 | 10.8 |
| | 0.4 | 5.0 | 4.8 | 10.5 |
| Decamethylcyclo pentasiloxane | 0.1 | 5.0 | 4.4 | 12.6 |
| | 0.2 | 5.0 | 4.2 | 12.2 |
| Silicone Fluid Emulsion | 0.75 | 4.25 | 6.05 | 12.09 |
| 15% Silicone Gum Emulsion | 15.00 | 4.25 | 3.75 | 8.86 |

The following examples are set forth in order to illustrate the invention in more detail.

The FANN Model 90 is a dynamic radial filtration apparatus, manufactured and sold by the Fann Instrument Company, Houston, Tex. The device evaluates the filtration properties of a circulation fluid through a ceramic core. Dynamic filtration simulates the effect of fluid movement (shear rate) on the filtration rate and filter cake deposition in an actual oil well.

The test determines if the fluid is properly conditioned to drill through permeable formations. The test results include two numbers, i.e., (i) the dynamic filtration rate, and (ii) the cake deposition index (CDI). The dynamic filtration rate is calculated from the slope of the curve of volume versus time. The CDI, which reflects the erodibility of the wall cake, is calculated from the slope of the curve of volume/time versus time. CDI and dynamic filtration rates are calculated using data collected after thirty minutes.

The Model 90 is a device used in the industry for conducting filter cake formation and permeability analysis for drilling fluid optimization. The Model 90 can be heated and pressurized to provide the closest possible simulation of downhole conditions. The filter medium is a thick walled cylinder with rock like characteristics to simulate the formation. The filter medium is available in varying porosities and permeabilities.

Filtration occurs radially from the inside of the filter core to the outside. At the same time, the filter cake is formed on the inside of the filter core to simulate filter cake formation on the wall of a borehole. A polished stainless steel shear bob runs through the central axis of the filter core. The shear bob is rotated to produce a concentric cylinder type shear across the filtration surface.

Into a 100 ml beaker were weighed and added 13.47 g of hydroxyethylcellulose, 6.71 g of xanthan gum, 1.84 g of sodium carbonate, and 0.81 g of the preservative 1-(3-chloroallyl)-3,5,7-triaza-1-azoniaadamantane chloride, a composition manufactured under the name Dowicil 75 by The Dow Chemical Company, Midland, Mich. The ingredients were mixed by hand using a spatula until they appeared homogeneous. 50.87 g of potassium chloride (KCL) were weighed into a 3000 ml beaker followed by 1629.5 g of water. The mixture was agitated with a mechanical stirrer for 5 minutes, at which time the KCl had completely dissolved. The contents of the 100 ml beaker were then added slowly to the KCl solution with continued agitation. After the contents of the 100 ml beaker had been added, the mixture was stirred for an additional 10 mninutes. The resulting liquid was a 3 percent KCl mud and it appeared homogeneous and slightly opaque. It had a density of 1.02 and a viscosity of 20 centipoise (mm$^2$/s). This 3 percent KCl mud was used to test fluid the shut-off properties of various silicone and non-silicone additives.

300 gram of a silicone resin powder obtained by drying in high shear mixer under vacuum were added to a 750 milliliter ball mill along with 300 gram of propylene glycol. A 3/16 inch tungsten carbide media was agitated for 120 minutes. The mixture was diluted with an additional 200 gram of propylene glycol and tungsten carbide media was removed. The particle size was measured and determined to have an average particle size of 10 micrometer. The dynamic fluid loss results were obtained in an aqueous mud system.

This example shows a processing method using a continuous horizontal fine media mill in place of an open top batch wet grinding attritor to eliminate foaming during processing. Thus, a silicone resin powder was generated and then retained in a Model FM-130 Littleford Brothers® Mixer attritor. To 20.89 pounds of the silicone resin powder was added 17.8 pounds of water; and 595 gram of Mazon 40, a nonionic surfactant and alkyl glycoside manufactured by BASF Corporation, Mount Olive, N.J. To the resultant slurry was added 386.9 gram of Dynasperse LCD, an anionic surfactant and modified-sodium lignosulfonate manufactured by Lignotech USA Inc., Bridgewater, N.J.; 580.3 gram of Pluronic F68LF, a nonionic surfactant and block copolymer of ethylene oxide and propylene oxide manufactured by BASF; 34.2 gram of Xanvis L, a thickener and xanthan biopolymer manufactured by the Kelco Oil Field Group, Houston, Tex.; and 7.9 gram Dowicil 75, a preservative of the composition 1-(3-chloroallyl)-3,5,7-triaza-1-azoniaadamantane chloride, manufactured by The Dow Chemical Company, Midland, Mich. These ingredients were mixed together. A vacuum was applied during the last 3-5 minutes of the mixing step to eliminate any foam that may have generated. The resultant slurry was fed to a DYNO-Mill® ECM horizontal media mill equipped with a 55 percent volumetric load of Ceria stabilized Tetragonal Zirconia Poly-crystal (TZP) 0.8 mm media. The slurry was processed using consecutive passes at tip speeds of 10 and 14 meters per second (m/s). The dispersion temperature did not exceed 84° F./28.9° C., a temperature well below the cloud point of the surfactants, and no foaming occurred. When the formulation was processed in an open top batch attritor however, 300-500 ppm of a commercial antifoam was added to control foam. The antifoam was a water dilutable 30 percent active silicone emulsion designed to control foam in aqueous systems, manufactured by the Dow Corning Corporation, Midland, Mich., under the name DOW CORNING® 1430 Antifoam.

The following two examples are set forth for the purpose of showing a well bore fluid composition containing solid silicone resin particulate having a multi-modal particle size distribution, in which improved results were shown in comparison to calcium carbonate. The first upper mode contained solid silicone resin particulate whose diameter was 30-50 percent of the targeted substrate pore diameter, and the second lower mode contained solid silicone particulate where the average diameter of the second mode was 2 µm or less.

This Example shows Fann 90 data obtained with calcium carbonate. To duplicate the particle size distribution obtained by the resin grinding process, two grades of ground calcium carbonate were obtained, i.e., Baracarb 5 and Gammafil D2. The two grades of calcium carbonate were combined in a ratio of one part coarse to two parts fine. The dry powders were added sequentially to a three percent KCl standard mud preparation to provide a total of five volume percent solids. The mixture was dispersed with moderate stirring in a paddle mixer. Sufficient of the mixture was added to the Fann 90 to fill the test cell.

The Fann 90 test device was operated using the conditions recommended by Fann Instrument Company instructions, i.e., temperature 30° C., 100 reciprocal seconds rotation, 10 µm core, and a differential pressure of 500 psi. Fluid loss results were taken directly from the Fann 90 device and used to calculate a fluid loss at 30 seconds of 13.32 ml, and a fluid loss rate from 30 seconds to 30 minutes of 0.005 ml per minute. The filter cake was observed to be intact upon inspection after removal from the test device.

The improved results provided by use of the silicone resin according to this invention over calcium carbonate in Example 3 is shown as follows. The silicone resin was prepared as shown in Example 1. To a three percent standard KCl drilling mud, sufficient of the slurry was added to provide a 5 volume percent solids content. The silicone resin containing slurry was dispersed in the drilling mud by shaking vigorously. Sufficient of the silicone resin mixture was added to the test cell of the Fann 90 test device to fill it.

The Fann 90 test was initiated using the same program of time, temperature, sheer rate, differential pressure, and filter core pore size, as in Example 3. The results determined a fluid loss at 30 seconds of 1.53 ml, and a fluid loss from 30 seconds to 30 minutes of 0.002 ml per minute. The filter cake was extremely thin, uniform, and nearly transparent upon inspection after removal from the test device. By comparison, the equivalent results obtained with calcium carbonate in Example 3 were fluid loss at 30 seconds of 13.32 ml; and fluid loss rate from 30 seconds to 30 minutes of 0.005 ml per minute.

This example shows the performance of the silicone resin at high temperatures in which the test cell was conditioned at 85° C. A The silicone resin slurry was obtained by the procedure used in Example 1 and consists of a blend of finely divided silicone resin particles and coarser silicone resin particles. A quantity of saturated sodium formate mud was obtained and sufficient of the silicone resin slurry was added to the mud to provide a five volume percent dispersion in the simulated drilling mud. The silicone resin concentrate was dispersed in the mud by shaking. Sufficient of the material was added to the Fann 90 test cell to fill the cell to its prescribed mark.

The conditions used in the Fann 90 test protocol were 85° C., 10 µm core, and differential pressure of 500 psi. The results obtained in the Fann 90 test were that the Fluid loss after 30 seconds was 7.76 ml/minute and the Fluid loss rate from 30 seconds to 30 minutes was 0.006. Upon removal from the test cell, the inner surface of the core was observed to have a thin uniform coating of the silicone resin indicating good filter cake build up.

This example shows the impact of exceeding the softening point or the glass transition temperature of a test material. Pentalyn was selected for the test. Its nominal-softening point was about 90° C. Pentalyn flake rosin ester resin was coarsely ground in a single stage disk mill. The finely ground Pentalyn resin material was separated by sifting through an 80 mesh screen. 100 gram of the sifted Pentalyn was added to 100 gram of water, and the resin was formulated into a slurry according to the procedure used in Example 2. The surfactant combination and their amounts were about the same, and its formulation into the slurry was necessary to permit adequate wetting of the Pentalyn resin particles by water.

The slurried Pentalyn rosin ester resin formulation was processed in a bead mill, using 0.8 mm ZrSiO4 beads rotated at 2,000-3,000 RPM for 40 minutes to reduce particle size. The milling yielded a pale, opaque, solid rosin dispersion in water. Sufficient of the, solid rosin dispersion was added to a 3 percent KCl mud to provide a solids concentration of about 5 volume percent. The rosin mixture was tested in the Fann 90 Dynamic Fluid loss testing device using the same general conditions employed in Example 3, i.e., a temperature of 120° C., 100 rpm rotation, a 10 µm Alconox powder core, and a differential pressure of 500 psi. However, the Fluid loss collection exceeded the capacity of the Fann 90 test device capacity of 50 milliliter, and so the Fann 90 test failed in less than about 5 seconds. After cooling the test device and opening the test cell, the fluid in the test cell was visually observed and seen to have loose chunks of materials floating on the surface. The appearance of the inner face of the filter core was observed as being thick and very irregular.

This example shows another silicone resin composition being prepared and tested at an elevated temperature. Thus, 6,350 gram of a silicone MQ resin as a 60 weight percent solution in xylene was employed as starting material. The xylene was removed under heated conditions of 120° C. and under vacuum of 200 inches of water. The silicone resin was prepared as a slurry using the same general procedure as set forth in Example 2. The resulting mixture was processed in a bead mill using 0.8 mm ZrSiO4 beads rotating at 2,000-3,000 RPM for 30 minutes. A sufficient amount of the silicone resin dispersion was added to a 3 percent KCl mud to provide a solids concentration of about 5 volume percent. The resulting silicone resin mixture was tested in the Fann 90 Dynamic Fluid loss tester using the same protocol and conditions employed in Example 6. The appearance of the filter cake was observed visually and seen to be thin and uniform. The data recorded in the Fann 90 test was that there was an initial 30 second Fluid loss of 11.26 ml, and a Fluid loss rate from 30 seconds to 30 minutes of 0.011 ml per minute.

This example shows the effect of adding kerosene to silicone resin compositions as a softening agent. Its addition also simulates the presence of oil in drilling muds. The simulated three percent KCL drilling mud containing five volume percent of the silicone resin slurry prepared in Example 5 was used for the test procedure in this example. To this simulated drilling mud mixture was added 0.4 volume percent of kerosene. The Fann 90 test device was operated in the same fashion using the same general protocol and conditions as in previous examples, i.e., a core size of 10 μm, a temperature of 120° C., and a pressure of 500 pounds per square inch differential across the filter core. The test results showed an initial. 30 second Fluid loss of 8.85 ml, and a Fluid loss rate from 30. seconds to 30 minutes of 0.005 ml per minute. The appearance of the filter cake was again very uniform and nearly transparent.

This example demonstrates the effect of the presence of a silicone emulsion on performance properties. A silicone resin slurry was prepared as in Example 3, and added to the KCL simulated drilling mud at about five volume percent. To the simulated mud was added about 0.2 volume percent of a standard aqueous silicone fluid emulsion of a 500 centistoke (mm$^2$/s) polydimethylsiloxane fluid and an ionic surfactant. The silicone fluid emulsion was expected to fill very tiny spaces between the solid silicone resin particles in the simulated mud and function as a softening agent when forced into intimate contact with the silicone resin in the filter cake. The Fann 90 test device was again operated under the same general conditions as used in previous examples, i.e., a core size of 10 μ, a temperature of 120° C., and a differential pressure of 500 pounds per square inch.

Upon cooling and removal from the test cell, the inner face of the Alconox core had a thin but irregular inner surface. This suggests that some agglomeration may have occurred. The fluid loss data determined by the Fann 90 test device was slightly improved for this embodiment, showing an initial 30 second Fluid loss of about 8.4 ml, and a Fluid loss rate from 30 seconds to 30 minutes of about 0.007 ml per minute.

This example demonstrates the stability of the silicone resin in a mud system under harsh conditions known as the hot roll test. The silicone resin was prepared as shown in Example 1 and dispersed in the drilling mud as demonstrated in Example 4. This sample also contained 0.5 volume percent of Kerosene acting as a softening agent. Prior to testing in the Fann 90 test, the sample was poured into a stainless steel cylinder leaving one inch from the top empty. The cylinder was sealed and pressurized with nitrogen at 100 lbs/in$^2$. The cylinder was placed in an oven equipped with a roller shaft. The cylinder was connected to the shaft and rotated at 20 RPM and at a temperature of 100° C. for 16 hours. It was removed and cooled by immersion in cold water. The pressure was released and the mixture was poured into the Fann 90 test cylinder and tested according to the parameters used in Example 3. The results were a fluid loss at 30 seconds of 7.5 ml/minute, and a fluid loss rate from 30 seconds to 30 minutes of 0.003 ml/minute. The filter cake was thin, uniform and nearly transparent upon inspection after its removal from the Fann 90 test device.

This example shows the effect of adding to a drilling mud a blend prepared from a particulate CaCO$_3$ and the particulate silicone resin composition used in Example 2. To a three percent KCl drilling mud was added sufficient of the silicone resin containing aqueous slurry to provide 2.5 percent by volume of the silicone resin in the KCl mud. The mixture was dispersed by shaking it vigorously in a capped jar for two minutes. Sufficient CaCO$_3$ particulate sold under the name Baracarb® 5 was then added to provide a level of 2.5 percent by volume of CaCO$_3$. The mixture was again shaken vigorously to disperse the CaCO$_3$, and the fluid loss properties were determined for the mud using the Fann 90 apparatus.

The Fann 90 test was performed using the same parameters of time, temperature, sheer rate, differential pressure and filter core size as in Example 3. The results from the test were a fluid loss after 30 seconds of 4.2 ml and after 30 minutes of 11.2 ml. The rate of fluid loss from 30 seconds to 30 minutes was 0.0039 ml/minute.

When a sample of the mud was subjected to the hot roll test at 100° C., 100 lbs/in$^2$, and for 16 hours, as described in Example 10, followed by testing using the Fann 90 test device and protocol, the results provided a fluid loss from 30 seconds of 11.7 ml and a fluid loss from 30 minutes of 22.9 ml. The rate of fluid loss from 30 seconds to 30 minutes was 0.0063 ml.

This example illustrates the poorer performance of muds if only larger particle sizes and no fines are employed. The silicone resin was an MQ type resin in solid particulate form, and it was put through a sieve shaker and the fraction which passed the 325 mesh was collected. Coulter Counter analysis of the powered silicone MQ resin yielded the following particle size distribution:

|  | Percent, by weight | | | | |
| --- | --- | --- | --- | --- | --- |
|  | 10 | 25 | 50.0 | 75.0 | 90.0 |
| Micrometer | 28 | 20 | 11.6 | 4.9 | 2.5 |

The mean particle size was 13.6 micrometer. A silicone MQ resin concentrate in an aqueous solution of surfactants and water containing 29 percent of solid silicone MQ resin was prepared. This concentrate was diluted to 6 percent solids in a KCl mud containing a viscosifier. The solution was tested in the Fann 90 test device at 50° C. with a 35 micrometer pore size filter core. The data was recorded manually with the following results: (i) zero to 38 seconds, a 29.3 ml fluid loss, and (ii) at 55 seconds, the fluid loss reached 50 ml which exceeded the capacity of the Fann 90 test device. The filter core was examined and determined to be a thick, very compact cake. The nonionic surfactants used in this example were (i) Tergitol 15 S40, an ethoxylated alcohol sold by The Dow Chemical Company, Midland, Mich., and (ii) a silicone glycol copolymer with an HLB of 10.5 sold under the name Superwetting Agent by the Dow Corning Corporation, Midland, Mich.

This example describes a wet grinding method for producing a fine particle size grade of silicone resin in a propylene glycol carrier. 21.6 pounds of silicone MQ resin was prepared in a solid particulate form by drying in a high shear mixer under vacuum. To the silicone MQ resin was added 25.6 pounds of propylene glycol, 354.4 gram of Mazon 40 nonionic surfactant, 350.6 gram of Dynasperse LCD anionic surfactant, 467.2 gram of: Pluronic F68 LF nonionic surfactant, 9.4 gram Dowicil 75 preservative, and 774 gram of water. 4.2 pounds of this mixture was diluted to a twenty-five percent solids by weight solution, with the further addition of propylene glycol. A Union Process Model 1-S Attritor was charged with 3/16 inch diameter tungsten carbide media and ground at 180 RPM for six hours. The silicone MQ resin particulate diameter was measured on a Honeywell Microtrac Model X-100 Analyzer and yielded the following volumetric particle size distribution in micrometer: D(v, 0.1)=0.368; D(v, 0.5)=1.177; and D(v, 0.9)=3.717.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A composition comprising solid particles of silicone resin with a glass transition temperature of more than 70° C., the composition containing solid particles of silicone resin with a particle size distribution wherein (i) at least 90 volume percent of solid particles of silicone resin have an average major axis diameter of 40 μm or less than 40 μm, and (ii) at least 10 volume percent of solid particles of silicone resin have an average major axis diameter of 2 μm or less.

2. A composition according to claim 1 further comprising a liquid carrier into which the solid particles of silicone resin are dispersed, the liquid carrier being an aqueous based carrier or a non-aqueous based carrier, the liquid carrier being a non-solvent for solid particles of the silicone resin, non-solvency being that the liquid carrier is capable of dissolving only one percent or Less of the solid particles of silicone resin at 70° C.

3. A composition according to claim 2 in which the liquid carrier is selected from the group consisting of water, diols, triols, glycerol esters, polyglycols, and mixtures thereof.

4. A composition according to claim 3 in which the liquid carrier is water, and the composition further comprises a surfactant.

5. A composition according to claim 3 in which the liquid carrier is a diol, and the composition further comprises a compatible surfactant.

6. A composition according to claim 2 in which the liquid carrier is selected from the group consisting of ethylene glycol, propylene glycol, glycerol, trimethylene glycol, and mixtures thereof.

7. A composition according to claim 1 in which the silicone resin contains only monovalent monofunctional M units ($R_3SiO_{1/2}$) and tetravalent tetrafunctional Q units ($SiO_{4/2}$) in which R is hydrogen, hydroxyl, a monovalent hydrocarbon Group having 1-8 carbon atoms, an alkoxy group, or a substituted monovalent hydrocarbon group.

8. A composition according to claim 7 in which the silicone resin contains no more than about 15 mole percent hydroxyl as determined by Nuclear Magnetic Resonance, the number ratio or molar fraction of M units to Q units being in the range of 0.4:1 to 1.7:1, and the weight average Molecular weight of the silicone resin being 8,000-30,000 as determined by gel permeation chromatography.

9. A composition according to claim 1 in which the silicone resin includes monovalent monofunctional M units ($R_3SiO_{1/2}$), divalent difunctional D units ($R_2SiO_{2/2}$), trivalent trifunctional T units ($RsiO_{3/2}$), and tetravalent tetrafunctional Q units ($SiO_{4/2}$, in which R is hydrogen, hydroxyl, a monovalent hydrocarbon group having 1-8 carbon atoms, an alkoxy group, or a substituted monovalent hydrocarbon group.

10. A composition according to claim 1 which further comprises solid particles of an inorganic material blended with the solid particles of silicone resin.

* * * * *